(No Model.)
R. COWEN.
DEVICE FOR SECURING HOSE TO COUPLINGS.
No. 398,582. Patented Feb. 26, 1889.
Fig. 1.
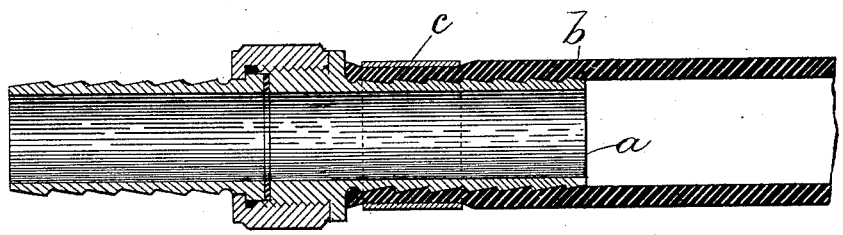
Fig. 3. Fig. 2.
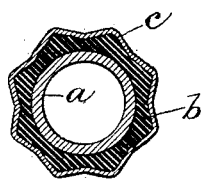 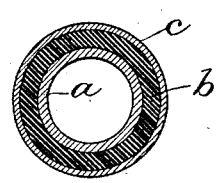
WITNESSES:
A. D. Harrison.
H. C. Ramsay.
INVENTOR:
Robert Cowen
by Wright Brown & Crosley
Attys.

UNITED STATES PATENT OFFICE.

ROBERT COWEN, OF BOSTON, MASSACHUSETTS, ASSIGNOR TO THE BOSTON WOVEN HOSE COMPANY, OF SAME PLACE.

DEVICE FOR SECURING HOSE TO COUPLINGS.

SPECIFICATION forming part of Letters Patent No. 398,582, dated February 26, 1889.

Application filed January 23, 1888. Serial No. 261,629. (No model.)

*To all whom it may concern:*

Be it known that I, ROBERT COWEN, of Boston, in the county of Suffolk and State of Massachusetts, have invented certain new and useful Improvements in Devices for Securing Hose to Couplings, of which the following is a specification.

This invention has for its object to provide a cheap, simple, and effective means for securing a piece of compressible hose or pipe to the tail-piece of a coupling or other like appliance; and it consists in the combination, with a tail-piece and a piece of compressible hose or pipe placed thereon, of a continuous ring of sheet metal surrounding that portion of the hose which incloses the tail-piece, said ring being corrugated or indented at regular intervals to form a series of arches, which compress portions of the hose against the tail-piece, the said arches by their form making the ring sufficiently strong to maintain its holding-pressure, as I will now proceed to describe.

Of the accompanying drawings, forming a part of this specification, Figure 1 represents a longitudinal section of a coupling having a section of rubber hose secured to one of its tail-pieces by my improvement. Fig. 2 represents a transverse section of the ring, tail-piece, and hose before the ring is corrugated. Fig. 3 represents a similar section after the ring is corrugated.

The same letters of reference indicate the same parts in all the figures.

In the drawings, *a* represents one of the tail-pieces of an ordinary coupling, (forming no part of my invention,) said tail-piece being externally corrugated, as usual.

*b* represents a piece of hose of compressible material—such as rubber—placed upon the tail-piece *a*.

*c* represents a continuous ring of any suitable sheet metal—such as copper, brass, or iron. Said ring, which is originally cylindrical, is placed while in cylindrical form upon that portion of the hose which incloses the tail-piece, and is of such diameter that it fits somewhat closely on the hose.

When the ring and hose are in place on the tail-piece, the ring is corrugated, as shown in Fig. 3, by pressing inwardly different parts of its periphery by means of any suitable appliance, preferably a series of jaws, which press simultaneously toward the center of the ring and thus form a series of inwardly-projecting or inverted arches separated by intermediate outwardly-projecting arches. The ring is thus caused to bind the hose firmly upon the tail-piece, the re-entrant curve or arch of each corrugation compressing the hose, as will be readily seen. The series of inwardly and outwardly projecting arches, by virtue of their arched form, fix or make permanent the hose-clamping shape imparted to the ring, so that the hose cannot be removed from the tail-piece without cutting the ring.

I claim—

The combination, with a tail-piece and a compressible hose or pipe placed thereon, of a metal ring placed upon that portion of the hose which receives the tail-piece, and corrugated or indented at intervals on the hose to form a series of inwardly projecting or inverted hose-clamping arches and intermediate outwardly-projecting arches, as set forth.

In testimony whereof I have signed my name to this specification, in the presence of two subscribing witnesses, this 20th day of January, 1888.

ROBERT COWEN.

Witnesses:
C. F. BROWN,
A. D. HARRISON.